INVENTORS W. M. HUBBARD
R. KOMPFNER
BY Wilford L. Wisner
ATTORNEY

United States Patent Office 3,530,298
Patented Sept. 22, 1970

3,530,298

OPTICAL HETERODYNE RECEIVER WITH PULSE WIDENING OR STRETCHING

William M. Hubbard, Middletown Township, Monmouth County, and Rudolf Kompfner, Middletown, N.J., assignors to Bell Telephone Laboratories, Incorporated, Murray Hill and Berkeley Heights, N.J., a corporation of New York Filed Apr. 17, 1968, Ser. No. 722,106
Int. Cl. H04b 9/00
U.S. Cl. 250—199 7 Claims

ABSTRACT OF THE DISCLOSURE

In the optical heterodyne receivers disclosed, the overall signal-to-noise ratio is improved by efficiently widening the information modulated pulses at some point in the down-conversion process so that their bandwidth is comparable to the bandwidth of the intermediate frequency portion of the receiver. In particular, dispersive widening techniques are disclosed. In the multiple-stage down-conversion processes disclosed, several different sequences of dispersive widening and mixing are employed.

BACKGROUND OF THE INVENTION

In the optical heterodyne receiver art which is being rapidly developed to fulfill future communication needs, much of the effort has been directed to pulsed communication systems because it presently appears that such systems can make the best use of the theoretically available bandwidth of an optical communication system. Moreover, in order to make the most efficient use of the wide bandwidth available in such a pulsed system, the optical pulses employed should be as short as possible.

Recent discoveries have shown that it is possible to obtain pulses of approximately 35 picasecond duration with neodymium-YAG lasers and pulses as short as the order of 1 picasecond with neodymium-glass lasers (1 picasecond equals $10^{-12}$ seconds). These pulses appear very attractive for high speed pulsed optical communication systems. However, in order to handle such short pulses, extremely wideband circuits are required. Circuits of this bandwidth are not available at frequencies at which gain and decision-making devices can be obtained. Consequently, it is necessary to find some technique for reducing the bandwidth required to handle the pulses. This bandwidth should be reduced before appropriate regeneration at a repeater or at a terminal can be obtained.

The present invention relates to an arrangement for reducing the bandwidth required to handle these pulses by widening them. Moreover, they are widened in a manner which does not waste signal power.

The importance of not wasting signal power is shown by the following analysis. One way to widen narrow pulses would be to pass them through a narrowband filter. However, in order to widen the pulse by a factor of 40 in order to make use of the signal in the example cited, about 39/40 of the power would be thrown away by such a filter. Consequently, any noise introduced into the circuit beyond the filter would effectively be 16 db worse than without this loss of power. In many optical receivers, a principal source of noise would be amplifiers at a relatively low intermediate frequency. Such noise must, of necessity, be introduced after this widening filter because neither down-converters nor economically feasible amplifiers can be built with sufficient bandwidth to handle the narrow pulses (at least at the present state of the art).

SUMMARY OF THE INVENTION

According to our invention, we have recognized that improved heterodyne reception of modulated optical pulses is achieved by efficiently widening or stretching the optical pulses or other lower frequency pulses modulated with the same information. The pulse widening is accomplished at any point (in the down-conversion process) before the bandwidth is reduced and is adapted to made the frequency bandwidth of the widened pulses substantially equal to the bandwidth of the following down-converter and intermediate frequency portion of the receiver.

According to one specific feature of our invention, the information modulated pulses are widened by subjecting them to one or more dispersive devices. By dispersive device, we mean any device for which the propagation constant for a wave in the device is not proportional to its frequency. With appropriate shaping of a frequency-sensitive delay characteristic in an illustrative dispersive device, a constant difference frequency is maintained among coincident portions of widened pulses of two different center or carrier frequencies.

According to another specific feature of our invention, the pulse widening is done at a millimeter-wave frequency, either before or after combining the information modulated pulses with pulses of a different millimeter-wave frequency. The widened millimeter-wave modulated pulses and the different millimeter-wave pulses, after combining, are then subjected to a further mixing process to produce widened different frequency pulses as an output. The widened difference frequency pulses are then detected or further down-converted.

It is one aspect of our invention that the pulse widening, and in particular, dispersive pulse widening can be accomplished at any selected frequency in the down-conversion process which is sufficiently high to accommodate the signal bandwidth.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
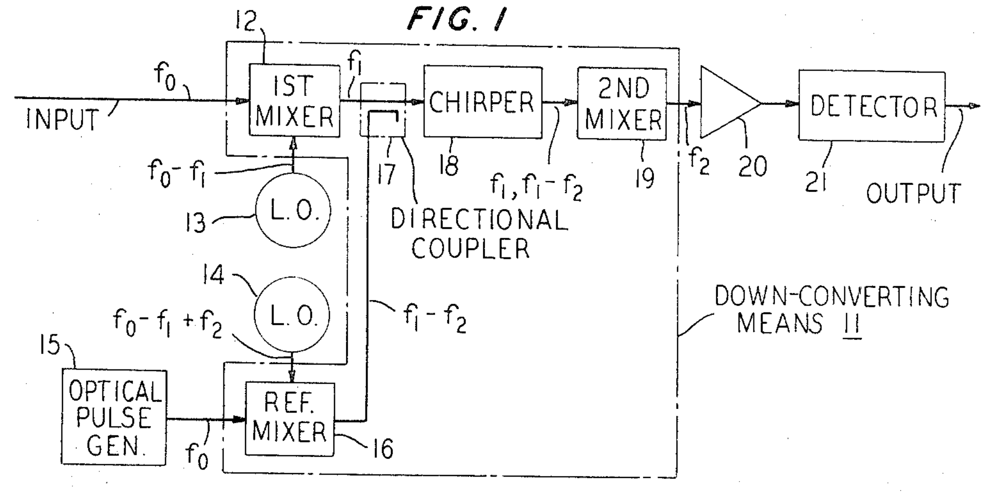
FIG. 1 is a block diagrammatic illustration of a first illustrative embodiment of the invention in which pulse widening is accomplished after combining first and second intermediate frequencies.

The illustrative embodiment of FIG. 1 is a heterodyne receiver for modulated optical pulses of center frequency or carrier frequency designated in the drawing as $f_0$. A heterodyne receiver is a receiver in a communication system in which the frequency of incoming modulated radiation is converted to another, typically lower, frequency before detection. The conversion to a lower frequency is typically called down-conversion.

Optical pulses are pulses of electromagnetic radiation having a wavelength shorter than about 100 microns. This wavelength corresponds to a frequency of about 3,000 gigahertz. One gigahertz equals $10^9$ cycles per second. The frequency ranges which lie below the optical range may be defined as follows. The submillimeter region is the region from 300 to 3,000 gigahertz. The millimeter-wave region is the region from 30 to 300 gigahertz. The microwave region is the region from 1 to 30 gigahertz. Pulse widening or stretching is the increase of the time duration of the pulse. Time duration is usually called pulse length or pulse width for brevity.

The dispersive means for widening pulses are appropriately adjusted devices which have a frequency-sensitive delay characteristic. Thus, lower frequencies may be delayed by a different amount from that of higher frequencies.

With the foregoing fundamentals as a basis, the illustrative embodiment of FIG. 1 is described as follows. The received modulated optical pulses of center frequency $f_0$, which comprise the input for the receiver of FIG. 1, are applied to the down-converting means 11. They are illustratively applied to the first optical mixer 12 therein. The relatively powerful local sources 13, 14 and 15 of optical pulses are also applied to the down-converting means 11. Pulses from sources 13 and 14 are of comparable length to the signal pulses but are of different center frequencies. Pulses from source 15 are as nearly identical to the signal pulses as practical except that they are much larger in amplitude and they are unmodulated. Pulses from source 13 are applied to the first optical mixer 12 along with the receiver pulses. Pulses from source 14 and from source 15 are applied to another optical mixer 16 designated the reference mixer. Mixers 12 and 16 are adapted to produce first and second different intermediate frequencies respectively $f_1$ and $f_1-f_2$.

The output of mixers 12 and 16 are combined in a directional coupler 17 and then are dispersively widened in the device 18 which is called a chirper. The output of chirper 18 consists of two waves having frequencies substantially centered about $f_1$ and $f_1-f_2$ (these waves contain substantial frequency modulation but their instantaneous frequencies differ by $f_2$ at all times). These waves are then applied to a conventional microwave mixer 19 to produce microwave intermediate frequency modulated pulses of center frequency $f_2$. These pulses are then amplified in microwave amplifier 20 and detected in a conventional microwave detector 21.

It should be noted that center frequencies and the bandwidths of all the intermediate frequency portions of the receiver, and in particular, the bandwidth of amplifier 20, are substantially smaller than the bandwidth of the received optical pulses. Thus, without the bandwidth compressing properties of the down-converting means, much of the signal power would be irretrievably lost because of the relatively narrow bandwidth of the IF circuit.

However, in our invention this power is not lost because of the bandwidth compression which takes place as follows. The narrow pulse enters the dispersive means or chirper 18, the pulse is widened and the frequency of the signal is modulated. The result is that the narrow pulse with constant center frequency that entered the chirper is converted by the chirper into a much wider pulse whose frequency is modulated from one edge of the pulse to the other. In fact, if the dispersion is linear, that is, if the time delay is proportional to the first power of the frequency, then the frequency modulation introduced by the chirper is also linear.

While this linearity is not essential for the operation of this invention, it seems entirely reasonable that such linear behavior is desirable if for no other reason than convenience. What is important is that the frequency modulation which the chirper causes on the signal pulse must be related to the frequency modulation which it causes on the reference pulse in such a way that the difference between the instantaneous frequencies of these two pulses is a constant (linear dispersion accomplishes this result). When this result obtains, the output of the second mixer is quite narrowband compared to the bandwidth of the original optical pulse because the wide pulses (which have considerable FM) that enter this down-converter come out at the IF frequency still as wide pulses but with an approximately constant carrier frequency. Any residual FM on the signal is due to imperfect design in the system, that is, it is not inherent in the nature of the signal.

Thus, the chirper has converted a narrow pulse with no FM into a wide pulse with FM. Then, the down-conversion process has converted the wide pulse with FM into a wide pulse with no FM; and the result is a pulse with considerably less bandwidth requirement. Thus, the pulse has been widened with comparatively little loss in signal power.

The received modulated optical pulses could typically be produced in a transmitter employing a suitable laser such as a neodymium-YAG (yttrium aluminum garnet host) operating upon the 1.06 micron transition of the neodymium ion. The laser is illustratively internally modulated at a 500 megahertz rate to enhance mode-locking and thus generate short pulses. The transmitter would further include suitable modulators for the 1.06 micron radiation, for example, a lithium tantalate modulator as disclosed in the copending patent application of A. A. Ballman et al., Ser. No. 615,811, filed Feb. 13, 1967 and assigned to the assignee hereof.

The local sources 13, 14 and 15 may be suitable lasers. Thus, source 15 could again be the neodymium laser at 1.06 microns and sources 13 and 14 can also be derived from a common neodymium ion laser applied to suitable optical frequency shifting devices. For example, these could be acousto-optic diffraction grating type frequency shifters of the general type shown in P. K. Tien Pat. 3,174,044, issued Mar. 16, 1965, for constant acoustic input frequencies and amplitudes. These sources also could be provided by shifting the frequencies obtained from a neodymium 1.06 micron laser with the optical frequency shifter disclosed in the copending patent application of M. A. Dugay, Ser. No. 586,153, filed Oct. 12, 1966, and assigned to the assignee hereof.

Figures 2, 4:
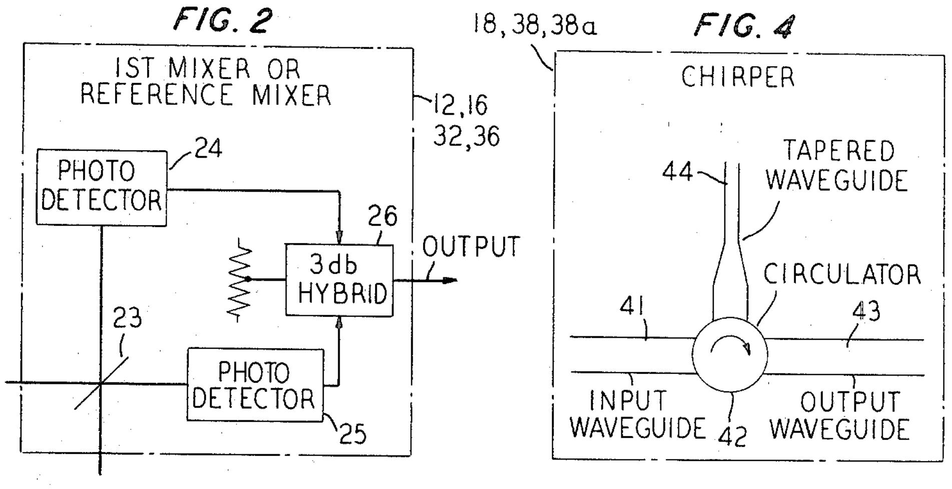
FIG. 2 is a partially block diagrammatic and partially schematic illustration of an illustrative form of the optical frequency mixers of the embodiment of FIG. 1.
FIG. 4 is a partially pictorial and partially block diagrammatic illustration of an illustrative dispersive means for pulse widening, called a "chirper."

The mixers 12 and 16 may illustratively be balanced first detectors or mixers as illustrated in FIG. 2. Thus, the optical pulses are combined so that each of two beams has 50 percent of the power of each pulse. The beams are directed in two different paths by the 50 percent transmissive reflector 23 disposed at a 45 degree angle to each of the two input optical pulse trains. The same intermediate frequency is obtained as an output of both photodetector 24 and photodetector 25. It is inherent in the phase relationships at the beam-splitting reflector or optical hybrid 23 that the intermediate frequency signals add in the millimeter-wave hybrid 26; while spurious noise components which are present equally in both paths and spurious amplitude modulation of the locally supplied pulses cancel in the hybrid 26. Photodetectors 24 and 25 are broadband photodetectors, such as carefully fabricated germanium photodiodes, suitable for 1.06 microns. Typically, such photodiodes would be characterized by small junction capacitance. The 3 db hybrid 26 and the directional coupler 17 may be of any broadband type suitable for millimeter waves. Such devices are commercially available.

Amplifier 20 and detector 21 are conventional microwave devices as is also the mixer 19. A description of a suitable microwave mixer may be found in the article by us and others in the Bell System Technical Journal, volume 46, page 1977 at page 1991, November 1967.

An illustrative form of chirper 18 is shown in FIG. 4 and comprises an input dominant mode rectangular waveguide 41, a circulator 42, an output dominant mode rectangular waveguide 43 and a reflective tapered waveguide 44 that is carefully shaped to provide the desired dispersion characteristics. For example, the reflective tapered waveguide 44 may be designed to have a substantially linear delay-versus-frequency characteristic by appropriately employing the equations and techniques disclosed in the article by Charles C. H. Tang in the I.E.E.E. Transactions on Microwave Theory and Techniques, volume 12, page 608, November 1964. To provide that the difference frequency of coincident portions of the two pulse trains widened millimeter-wave pulses is constant, the higher millimeter-wave frequency may be injected into chirper 18 leading the lower frequency millimeter wave in time by a selected amount that compensates for the greater delay of the higher frequencies. The taper can be constructed by electroforming a section of waveguide with suitable mandrels. Instead of a tapered waveguide, the chirper 18 could also be a section of waveguide near cutoff, a meander line, or any other device exhibiting substantial dispersion.

Additional details of the operation of the embodiment of FIG. 1 are as follows. The input signal to down-converting means 11 is illustratively a binary optical signal consisting of a pulse or no pulse of optical energy in each of a series of time slots characteristic of the remote transmitter. Such an input signal is merely illustrative, since it could also be, for example, a more complex signal such as would be received in a polarization modulation system in which the two signal states have been separated into two paths. The first mixer 12 translates the input signal at frequency $f_0$ to a first intermediate frequency $f_1$, which is illustratively a millimeter-wave frequency. (100 gigahertz to 200 gigahertz for received pulses 25 pica-seconds wide occurring at one nanosecond intervals.)

More specifically, the down-converted signal at frequency $f_1$ is produced by the balance mixing action of the arrangement shown in FIG. 2. The local oscillator pulses of like width and spacing at frequency $f_0-f_1$ are combined with the input pulses at the optical hybrid 23 in each of two paths and are mixed to produce the difference frequency in photodetectors 24 and 25 in each of the two paths respectively. The millimeter-wave 3 db hybrid 26 then combines the output millimeter-wave signals from photodetectors 24 and 25 in a manner similar to that in any balanced detector. It should be noted that the information content of the signal at frequency $f_1$ is still represented by the presence or absence of a pulse.

Similarly, the locally generated pulses of like width and spacing to the received pulses and of frequencies $f_0$ and $f_0-f_1+f_2$, as produced by sources 14 and 15 respectively, are mixed in reference mixer 16 to produce the second intermediate frequency $f_1-f_2$. This frequency is also a millimeter-wave frequency. The first and second intermediate millimeter-wave frequencies are then combined by the directional coupler 17 and applied to the input of chirper 18. Illustratively, the path lengths are chosen so that the higher frequency pulses arrive slightly ahead of the lower frequency pulses to compensate for the extra delay they sustain, on the average, in chirper 18.

As shown in FIG. 4, the two intermediate frequency signals enter chirper 18 through an input waveguide 41 and encounter the circulator 42. From circulator 42 they are first routed to the reflective tapered waveguide 44 where the various frequency components of the extremely short pulses undergo delay that is directly proportional to their frequency. Since the higher frequency components of the signal penetrate deeper into the taper before being reflected than the lower frequency components, their round-trip transit time is longer. The taper is shaped so that a substantially linear delay-versus-frequency characteristic is obtained for both sets of intermediate frequency pulses. The pulses travel from the tapered waveguide 44 back into circulator 42 and then to the output waveguide 43 which comprises the output of chirper 18. At this point, coincident portions of the widened pulses of the two intermediate frequencies have a frequency difference which is constant and substantially equal to $f_2$, the original difference between the carrier or center frequencies of the pulses. Although the pulses are now traveling together down the waveguide 43, they do not mix until they enter the conventional microwave mixer 19. Thus, a set of widened pulses of frequency $f_2$ is obtained at the output of mixer 19 which is also the output of down-converting means 11. These pulses are then regenerated in the microwave amplifier 20, which illustratively has a threshold for amplification which is characteristic of microwave regenerative repeater amplifiers. The regenerated and amplified pulses are then detected in the conventional microwave detector 21.

It may be noted that the widening of the pulses in chirper 18 provides an amplitude-modulation to frequency-modulation conversion of the signal and local oscillator pulses. This conversion plus the frequency-tracking between the signal and local oscillator pulses causes the IF signal power to be concentrated in a significantly smaller bandwidth than the original signal required. In other words, the spectrum of the frequency components has been reduced.

It should be apparent that there are many other ways of performing the dispersive pulse widening achieved in chirper 18. It is well known that, if a pulse of electromagnetic energy is passed through a dispersive medium, its shape is altered. In particular, if there is no angle modulation on the pulse initially, a dispersive medium widens the pulse and angle modulates it. For two identically shaped pulses with center frequencies differing by a small percentage of their values, as in FIG. 1, the angle modulation can preserve the frequency difference of the two pulses very closely. The output pulse obtained by mixing the widened pulses carries the information modulation of the original signal pulse.

The embodiment of FIG. 1 is relatively compact and simple in that it employs only one chirper 18. Nevertheless, it may, on occasion, be advantageous to place the chirper ahead of the directional coupler 17. In this case, two chirpers, one in each path, would be employed. The reasons for this modification are twofold. First, the transient response behavior of the directional coupler 17 (or hybrid 37 in FIG. 3) would be less critical for widened pulses than for narrow pulses. Second, and more importantly, the chirpers can be designed for the two millimeter-wave intermediate frequencies individually. Such a modified embodiment is shown in FIG. 3.

Figure 3:
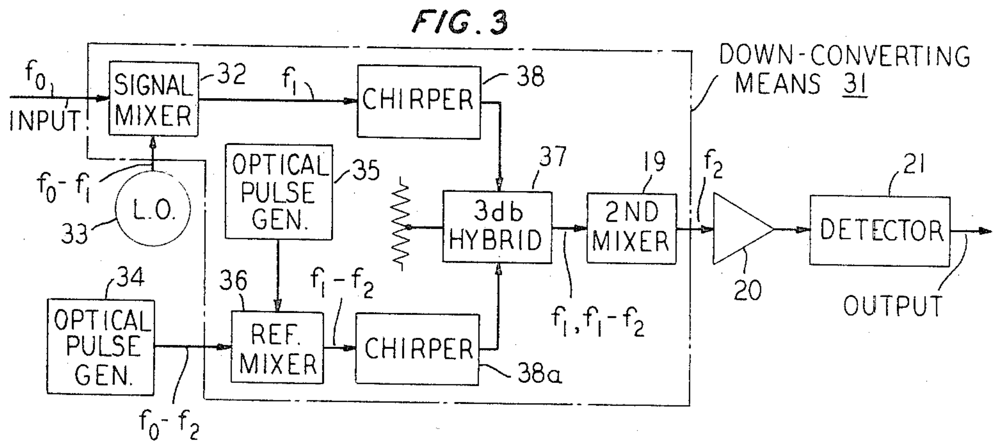
FIG. 3 is a block diagrammatic illustration of a second illustrative embodiment of the invention in which pulse widening is performed separately on first and second intermediate frequencies before combining them.

In the embodiment of FIG. 3, mixers 32 and 36 are like mixers 12 and 16 of FIG. 1 respectively. Similarly, the local oscillator pulses from the local sources 33 and 34 are derived in a manner similar to that described above for local sources 13 and 14. Chirpers 38 and **38*a* are both of the type shown in FIG. 4. Using the design equations of the above-cited article by Tang, we find that a taper of length approximately 5 inches or less with tolerances of about ±0.001 inch on the cross-sectional dimensions can be shaped to be satisfactory chirpers 38 and 38*a* for reasonable millimeter-wave frequencies. The 3 db hybrid 37 is like the hybrid 26 shown in FIG. 2 and described above with reference to the embodiment of FIG. 1. Since the input to and output of mixer 19 in the embodiment of FIG. 3 is the same as in the embodiment of FIG. 1 and since the local oscillator pulses from local sources 33 and 34 differ somewhat in frequency from the comparable local sources of FIG. 1, it may be appreciated that there are a virtually unlimited number of ways in which to mix optical pulse frequencies to obtain the desired intermediate millimeter-wave frequencies $f_1$ and $f_1-f_2$. In this case, the local source 33 provides a signal to both mixers 32 and 36**. It should be noted that the different choices of frequencies in these two examples is illustrative. Either set of frequencies could be used in either embodiment.

The principal difference between the embodiment of FIG. 3 and the embodiment of FIG. 1 is that each of the intermediate frequency signals is chirped separately so that much more precisely selected delay-versus-frequency characteristics can be obtained for both signals. The relative path lengths to hybrid 37 are then adjusted so that the leading edges of corresponding widened pulses arrive at hybrid 37 simultaneously. Then, the coincident portions of the widened pulses which are mixed in mixer 19 have a constant frequency difference equal to $f_2$.

Various modifications of our invention will be apparent to those skilled in the art. For example, it is contemplated that our invention will be particularly useful in each receiver channel of a time-division-multiplexed communication system. The pulse widening would occur in each channel after time-division-demultiplexing.

What is claimed is:

1. A heterodyne receiver for modulated pulses of optical radiation, comprising at least one local source of optical pulses of center frequency differing from that of the received modulated pulses, means cooperative with said local source for down-converting the center frequency of the modulated received pulses to a lower center frequency, including circuitry of bandwidth less than the bandwidth required to handle said modulated received pulses, and means preceding said circuitry for widening pulses of selected center frequencies in said down-converting means to reduce the bandwidth of the widened pulses to be approximately equal to or less than said bandwidth of said circuitry, and means for detecting output pulses from said down-converting means.

2. A heterodyne receiver according to claim 1 in which the local source supplies optical pulses of length substantially equal to the length of the modulated received pulses and frequency differing from the frequency of the modulated received pulses by a difference frequency, the down-converter includes means for mixing the modulated received pulses and the pulses from said local source to produce modulated difference frequency pulses, and the means for widening pulses comprises dispersive means adapted to receive the modulated difference frequency pulses from said mixing means and produce pulses that are dispersively widened modulated pulses.

3. A heterodyne receiver according to claim 2 in which the local source is adapted to make the difference frequency pulses to be millimeter-wave pulses and in which the down-converting means includes means for generating reference millimeter-wave pulses of center frequency differing from the center frequency of the modulated millimeter-wave pulses by a second difference frequency, the means for widening pulses including dispersive means for widening the reference millimeter-wave pulses to a time duration substantially equal to that of the widened modulated millimeter-wave pulses, and means for mixing the widened modulated millimeter-wave pulses with the widened reference millimeter-wave pulses to produce modulated output pulses at the second difference frequency, the detecting means being adapted to detect the modulation of the modulated output pulses at the second difference frequency.

4. A heterodyne receiver according to claim 1 including a second local source of optical pulses of length substantially equal to the length of the modulated received pulses and of center frequency differing from both the center frequency of the modulated received pulses and the center frequency of the optical pulses from the first local source, the down-converting means including first means for mixing the modulated received pulses with the pulses from the first local source to produce modulated pulses of a first intermediate frequency, means for converting the pulses from the second local source to a second intermediate frequency differing from the first intermediate frequency by a difference frequency at least one order of magnitude smaller than either the first or second intermediate frequencies, means for combining said pulses of the first and second intermediate frequencies without mixing of said pulses, the means for widening pulses comprising means for dispersively widening said combined pulses, and means for mixing said wedened combined pulses to produce modulated pulses at said difference frequency.

5. A heterodyne receiver according to claim 4 in which the means for dispersively widening pulses comprises a reflective tapered waveguide.

6. A heterodyne receiver according to claim 1 including a second local source of optical pulses of length substantially equal to the length of the modulated received pulses and of center frequency differing from both the center frequency of the modulated received pulses and the center frequency of the optical pulses from the first local source, the down-converting means including first means for mixing the modulated received pulses with the pulses from the first local source to produce modulated pulses of a first intermediate frequency, means for converting the pulses from the second local source to a second intermediate frequency differing from the first intermediate frequency by a difference frequency at least one order of magnitude smaller than either the first or second intermediate frequencies, the means for widening pulses comprising first and second means for dispersively widening pulses from said fisrt mixing means and said second intermediate frequency converting means respectively, means for combining the widened pulses from said first and second dispersively widening means, and means for mixing said combined widened intermediate frequency pulses to produce modulated pulses at said difference frequency.

7. A heterodyne receiver according to claim 4 in which the first and second means for dispersively widening pulses comprise first and second reflective taped waveguides.

References Cited

UNITED STATES PATENTS

| | | | |
|---|---|---|---|
| 3,191,047 | 6/1965 | Oliver | 250—220 |
| 3,426,207 | 2/1969 | Fried | 250—199 |
| 3,446,971 | 5/1969 | Ruddock | 250—207 |
| 3,482,099 | 12/1969 | Goodwin | 250—199 |

ROBERT L. GRIFFIN, Primary Examiner

K. W. WEINSTEIN, Assistant Examiner

U.S. Cl. X.R.

329—144; 331—94.5; 332—7.51